United States Patent Office 3,432,553
Patented Mar. 11, 1969

3,432,553
PROCESS FOR MANUFACTURING 1,3-DIAMINOPROPANOL-(2)
Heinz Enders, Stadtbergen-Augsburg, and Gunter Pusch, Leitershofen-Augsburg, Germany, assignors to Chemische Fabrik Pfersee G.m.b.H., Augsburg, Germany, a firm of Germany
No Drawing. Continuation-in-part of application Ser. No. 537,316, Mar. 25, 1966. This application Sept. 28, 1966, Ser. No. 582,497
U.S. Cl. 260—585    3 Claims
Int. Cl. C07c 91/00, 85/04

ABSTRACT OF THE DISCLOSURE

Process for manufacturing 1,3-diaminopropanol-(2) by reacting in a first stage one mole of epichlorhydrin with more than 26 moles of ammonia in form of aqueous ammonia solution containing at least 24% of ammonia at below 30° C. until the termination of the exothermic reaction during a time of a few minutes up to 6 hours. In a second stage strong alkali in a quantity which is at least equivalent to the chlorine content is added, the temperature being below 30° C. and the reaction time amounting to ¼ up to 6 hours, and isolating the diaminopropanol.

---

This invention relates to a process for the manufacture of 1,3-diaminopropanol-(2) which is useful as an intermediate product for the manufacture of 5-hydroxytetrahydropyrimidone-(2) and for a variety of other purposes.

This application is a continuation-in-part of our copending patent application Ser. No. 537,316, filed Mar. 25, 1966, now abandoned.

U.S. Patent No. 1,985,885 describes the manufacture of 1,3-diaminopropanol-(2) from glycerindichlorhydrin. According to this process dichlorhydrin is reacted with an aqueous solution containing 10–20 moles ammonia per 1 mole dichlorhydrin in a concentration of at least 15% and also containing an amount of strong alkali theoretically necessary to bind the chlorine which is present. The yields of diaminopropanol which can be achieved with this process amount to not more than 40% with reference to the used amount of dichlorhydrin.

If the substantially cheaper epichlorhydrin which is also described in said patent is used as the basic material, the yields of diamine are less than 10% with reference to epichlorhydrin.

An object of the present invention is to improve prior art processes for the manufacture of 1,3-diaminopropanol-(2).

Other objects will become apparent in the course of the following specification.

The accomplishment of the objectives of the present invention is based in part on the discovery that epichlorhydrin used as a basic material can produce very good yields of 1,3-diaminopropanol-(2) provided that epichlorhydrin is reacted in two stages with a great excess of an aqueous highly concentrated ammonia solution. The first stage must be then carried out in the absence of strong alkalis, while only in the second stage the necessary quantity of the strong alkalis must be added.

A surprising discovery consisted in that the yields of desired diamine can be increased by 8 to 10 times provided that the epichlorhydrin is initially reacted with the greatest excess of highly concentrated aqueous ammonia solution and only thereafter the addition of the strong alkali takes place which is necessary to bind the chlorine which is present; then the reaction is allowed to terminate.

The aqueous solution used for the reaction should contain more than 24% of ammonia, more particularly 28% to 40% ammonia, whereby the temperature at the beginning of the reaction should not be over 25° C. and preferably should be below 10° C. The amount of ammonia which is used, should be more than 26 moles, more particularly from 30 to 50 moles of ammonia for one mole of epichlorhydrin. During the first reaction stage, that is the stage of the reaction in the absence of strong alkali, the epichlorhydrin is added to the aqueous solution of the ammonia, whereby an intense exothermic reaction occurs. The temperature should not increase to more than 30° C. with respect to the loss of gaseous ammonia; this is attained by intense cooling. The duration of this first stage depends on the capacity of the cooling system insomuch as the epichlorhydrin may be added to the ammonia solution more or less quickly. Therefore, the duration of this first stage is varied in a large interval, namely from a few minutes to 6 hours, particularly ¼ of an hour to 3 hours. This first stage is finished as soon as no longer evolution of reaction heat occurs.

During the second stage, namely, after the expiration of the above-indicated reaction time, the amount of strong alkalis required to bind the chlorine which is present, is added in solid form or in the form of its highly concentrated aqueous solution. This second stage is only slightly exothermic and, therefore, cooling is not absolutely necessary; however, the temperature after the addition of the alkali should also not exceed 30° C. and should lie preferably between 10° C. and 20° C. The duration of the second reaction stage is ¼ of an hour to 6 hours, particularly ½ hour to 6 hours, but standing for a longer time, e.g. overnight does not decrease the yield of the 1,3-diaminopropanol-(2).

Hydroxides of alkali metals are suitable in practice as the strong alkalis.

The amount of the alkali which is being used, should be approximately equivalent to the amount of chlorine which is present, although slight excessive amounts of alkali can be used.

The further treatment of the diamine-containing solution can be carried out in the usual manner by removing excessive ammonia, distilling off the water, filtering off the sodium chloride and thereupon providing vacuum distillation of the raw diamine. However, the raw diamine can be used for many purposes directly after the removal of the sodium chloride, since the proportion of the higher amines produced as by-products, does not amount to more than 20% in relation to the amount of the raw diamine.

As already stated, 1,3-diaminopropanol-(2) which is thus produced can be used as an intermediate product, particularly for the manufacture of 5-hydroxytetrahydropyrimidone-(2). It can be also used for other purposes set forth in the aforesaid U.S. patent.

The following example is given by way of exemplification only:

Example

To 16 l. ammonia solution having a concentration of 34% $NH_3$ and a temperature of about 10° C. while stirring thoroughly and cooling are added 650 g. (7 moles) epichlorhydrin in such an amount that the reaction temperature does not exceed 30° C. After about 1½ hours no longer reaction heat is observed and the first reaction stage is finished. 300 gr. (7½ moles) sodium hydroxide (NaOH) are added and are allowed to continue reacting for another hour at a temperature of 10° C. to 20° C. After the half mole of caustic soda lye excess has been neutralized with hydrochloric acid, $NH_3$ and water are evaporated under normal pressure at a temperature of up to 108° C. The residue is cooled and remains standing overnight. Sodium chloride is freed from the raw diamine solution by filtering by means of a Buchner funnel or by centrifuging; a subsequent rinsing with a small amount of methanol takes place. In this manner 1560 g. raw diamine are produced having a nitrogen content of 11%. This is a yield of raw diamine of about 80%; since it contains 15% to 20% of higher amines, the calculated yield is that of 60%–65% of 1,3-diaminopropanol-(2). The purity of this raw diamine solution is sufficient to enable it to be reacted with urea to form 5-hydroxytetrahydropyrimidone-(2).

When raw diamine is distilled in vacuum 400 g. of pure 1,3-diaminopropanol-(2) are produced; this corresponds to a yield of 64% in relation to the used amount of epichlorhydrin.

What is claimed is:

1. The process for manufacturing 1,3-diaminopropanol-(2), which comprises, reacting in a first stage one mole of epichlorhydrin with more than 26 moles of ammonia in form of aqueous ammonia solution containing at least 24% of ammonia at below 30° C. until the termination of the exothermic reaction during a time period of a few minutes up to 6 hours and subsequently adding in a second stage strong alkali in a quantity which is at least equivalent to the chlorine contents, the temperature being below 30° C. and the reaction time amounting to ¼ up to 6 hours, and finally isolating the diaminopropanol.

2. The process in accordance with claim 1, wherein the aqueous solution contains 28% to 40% ammonia and wherein the amount of ammonia is from 30 to 50 moles for one mole of epichlorhydrin.

3. The process in accordance with claim 1, wherein the strong alkali consists of a hydroxide of an alkali metal.

References Cited

UNITED STATES PATENTS 2,104,092   1/1938   Munz et al.

CHARLES B. PARKER, *Primary Examiner.*

R. L. RAYMOND, *Assistant Examiner.*

U.S. Cl. X.R.

260—584